United States Patent
Willis et al.

(10) Patent No.: US 10,166,725 B2
(45) Date of Patent: Jan. 1, 2019

(54) THREE DIMENSIONAL PRINTING ADHESION REDUCTION USING PHOTOINHIBITION

(71) Applicant: Holo, Inc., San Francisco, CA (US)

(72) Inventors: Karl Willis, Millbrae, CA (US); Brian James Adzima, San Francisco, CA (US)

(73) Assignee: HOLO, INC., Oakland, CA (US)

(*) Notice: Subject to any disclaimer, the term of this patent is extended or adjusted under 35 U.S.C. 154(b) by 312 days.

(21) Appl. No.: 14/848,162

(22) Filed: Sep. 8, 2015

(65) Prior Publication Data

US 2016/0067921 A1    Mar. 10, 2016

Related U.S. Application Data

(60) Provisional application No. 62/047,308, filed on Sep. 8, 2014.

(51) Int. Cl.
*B29C 67/00* (2017.01)
*B29K 105/00* (2006.01)
(Continued)

(52) U.S. Cl.
CPC ........ *B29C 67/0062* (2013.01); *B29C 67/007* (2013.01); *B29C 67/0085* (2013.01);
(Continued)

(58) Field of Classification Search
CPC ............ B29C 67/0062; B29C 67/0085; B29C 67/007; B29C 64/124; B29C 64/129;
(Continued)

(56) References Cited

U.S. PATENT DOCUMENTS 4,801,477 A * 1/1989 Fudim ................... G03F 7/0037
                                                    264/401
4,961,154 A * 10/1990 Pomerantz ............. G09B 23/00
                                                    264/255
(Continued)

FOREIGN PATENT DOCUMENTS

CN        104890245 A      9/2015
DE        3926869 A1       2/1991
(Continued)

OTHER PUBLICATIONS

Berg et al., "A dual-cure, solid-state photoresist combining a thermoreversible Diels-Alder network and a chain growth acrylate network," Macromolecules, 47(10):3473-3482 (2014).
(Continued)

*Primary Examiner* — Jason L Lazorcik
(74) *Attorney, Agent, or Firm* — Wilson Sonsini Goodrich & Rosati

(57) ABSTRACT

Methods, systems, and apparatus, including medium-encoded computer program products, for three dimensional print adhesion reduction using photoinhibition include, in one aspect, a method including: moving a build plate in a vat of liquid including a photoactive resin; creating a photoinhibition layer within the liquid directly adjacent a window of the vat by directing a first light through the window into the liquid, the first light having a first wavelength selected to produce photoinhibition; and creating a solid structure on the build plate from the photoactive resin within a photoinitiation layer of the liquid by directing a second light through the window into the liquid, where the photoinitiation layer resides between the photoinhibition layer and the build plate, and the second light has a second wavelength different than the first wavelength.

15 Claims, 4 Drawing Sheets

(51) Int. Cl.
  *B33Y 10/00* (2015.01)
  *B33Y 30/00* (2015.01)
(52) U.S. Cl.
  CPC ....... *B29K 2105/0058* (2013.01); *B33Y 10/00* (2014.12); *B33Y 30/00* (2014.12)
(58) Field of Classification Search
  CPC ..... B29C 64/135; B29C 64/20; B29C 64/264; B29C 64/277; B29C 64/282; B29C 64/393
  See application file for complete search history.

(56) References Cited

U.S. PATENT DOCUMENTS

| | | | |
|---|---|---|---|
| 5,137,662 A * | 8/1992 | Hull | G01J 1/4257 118/620 |
| 5,236,326 A * | 8/1993 | Grossa | B29C 64/135 118/620 |
| 5,248,456 A * | 9/1993 | Evans, Jr. | B33Y 40/00 118/423 |
| 5,531,958 A | 7/1996 | Krueger | |
| 5,656,297 A | 8/1997 | Bernstein et al. | |
| 5,676,745 A | 10/1997 | Kelly et al. | |
| 5,877,270 A | 3/1999 | Takayama et al. | |
| 5,922,507 A | 7/1999 | Van et al. | |
| 5,998,496 A | 12/1999 | Hassoon et al. | |
| 6,259,962 B1 | 7/2001 | Gothait | |
| 6,664,354 B2 | 12/2003 | Savu et al. | |
| 6,780,472 B2 | 8/2004 | Hamrock et al. | |
| 6,833,043 B1 | 12/2004 | Parsonage et al. | |
| 6,850,334 B1 | 2/2005 | Gothait | |
| 6,852,781 B2 | 2/2005 | Savu et al. | |
| 7,022,410 B2 | 4/2006 | Tonapi et al. | |
| 7,101,618 B2 | 9/2006 | Coggio et al. | |
| 7,173,778 B2 | 2/2007 | Jing et al. | |
| 7,195,472 B2 | 3/2007 | John | |
| 7,209,797 B2 | 4/2007 | Kritchman et al. | |
| 7,223,826 B2 | 5/2007 | Ali et al. | |
| 7,267,850 B2 | 9/2007 | Coggio et al. | |
| 7,288,469 B2 | 10/2007 | Sharma et al. | |
| 7,288,514 B2 | 10/2007 | Scheuing et al. | |
| 7,332,217 B2 | 2/2008 | Coggio et al. | |
| 7,417,099 B2 | 8/2008 | Savu et al. | |
| 7,438,846 B2 | 10/2008 | John | |
| 7,491,441 B2 | 2/2009 | Pokorny et al. | |
| 7,511,008 B2 | 3/2009 | Scheuing et al. | |
| 7,575,847 B2 | 8/2009 | Jing et al. | |
| 7,632,560 B2 | 12/2009 | Filippini et al. | |
| 7,662,896 B2 | 2/2010 | Savu et al. | |
| 7,718,264 B2 | 5/2010 | Klun et al. | |
| 7,845,930 B2 | 12/2010 | Shkolnik et al. | |
| 7,907,878 B2 | 3/2011 | Takagi et al. | |
| 7,912,411 B2 | 3/2011 | Takagi et al. | |
| 8,110,135 B2 | 2/2012 | El-Siblani | |
| 8,133,551 B2 | 3/2012 | Claes | |
| 8,147,966 B2 | 4/2012 | Klun et al. | |
| 8,372,330 B2 | 2/2013 | El-Siblani et al. | |
| 8,372,913 B2 | 2/2013 | Claes | |
| 8,394,313 B2 | 3/2013 | Shkolnik et al. | |
| 8,476,398 B2 | 7/2013 | Klun et al. | |
| 8,551,285 B2 | 10/2013 | Ho et al. | |
| 8,623,264 B2 | 1/2014 | Rohner et al. | |
| 8,696,971 B2 | 4/2014 | Boot et al. | |
| 8,716,377 B2 | 5/2014 | Taden et al. | |
| 8,729,211 B2 | 5/2014 | Klun et al. | |
| 8,741,203 B2 | 6/2014 | Liska et al. | |
| 8,753,464 B2 | 6/2014 | Khanna | |
| 8,753,714 B2 * | 6/2014 | Cheung | B29C 67/0066 427/230 |
| 8,801,418 B2 | 8/2014 | El-Siblani et al. | |
| 8,829,070 B2 | 9/2014 | Morita et al. | |
| 8,859,642 B2 | 10/2014 | Miyamoto | |
| 8,916,335 B2 | 12/2014 | Kitano et al. | |
| 9,120,270 B2 | 9/2015 | Chen et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,306,218 B2 | 4/2016 | Pyun et al. | |
| 9,360,757 B2 | 6/2016 | Desimone et al. | |
| 9,367,049 B2 | 6/2016 | Jariwala et al. | |
| 9,415,418 B2 | 8/2016 | Sreenivasan et al. | |
| 9,452,567 B2 | 9/2016 | Syao et al. | |
| 9,453,142 B2 | 9/2016 | Rolland et al. | |
| 9,486,944 B2 | 11/2016 | El-Siblani et al. | |
| 9,492,969 B2 * | 11/2016 | Spadaccini | G03H 1/2294 |
| 9,498,920 B2 | 11/2016 | Desimone et al. | |
| 9,527,244 B2 | 12/2016 | El-Siblani et al. | |
| 9,533,450 B2 | 1/2017 | El-Siblani et al. | |
| 9,561,623 B2 | 2/2017 | El-Siblani et al. | |
| 9,567,439 B1 | 2/2017 | Pyun et al. | |
| 9,598,606 B2 | 3/2017 | Rolland et al. | |
| 9,676,963 B2 | 6/2017 | Rolland et al. | |
| 9,718,096 B2 | 8/2017 | Sreenivasan et al. | |
| 9,782,934 B2 | 10/2017 | Willis et al. | |
| 9,796,138 B2 | 10/2017 | Liska et al. | |
| 9,833,839 B2 | 12/2017 | Gibson et al. | |
| 9,975,295 B2 | 5/2018 | Rolland et al. | |
| 9,975,296 B2 | 5/2018 | El-Siblani et al. | |
| 9,982,164 B2 | 5/2018 | Rolland et al. | |
| 9,987,653 B2 | 6/2018 | Sreenivasan et al. | |
| 9,987,804 B2 | 6/2018 | El-Siblani et al. | |
| 9,993,974 B2 | 6/2018 | Desimone et al. | |
| 1,001,107 A1 | 7/2018 | El-Siblani Ali et al. | |
| 1,001,693 A1 | 7/2018 | Desimone et al. | |
| 2004/0138049 A1 | 7/2004 | Yasrebi et al. | |
| 2006/0054039 A1 | 3/2006 | Kritchman et al. | |
| 2007/0264481 A1 | 11/2007 | DeSimone et al. | |
| 2009/0196946 A1 | 8/2009 | Kihara et al. | |
| 2010/0028994 A1 | 2/2010 | DeSimone et al. | |
| 2010/0125356 A1 | 5/2010 | Shkolnik et al. | |
| 2010/0173096 A1 * | 7/2010 | Kritchman | B33Y 30/00 427/553 |
| 2011/0089610 A1 | 4/2011 | El-Siblani et al. | |
| 2011/0181941 A1 * | 7/2011 | Henningsen | B33Y 40/00 359/290 |
| 2011/0182805 A1 | 7/2011 | DeSimone et al. | |
| 2011/0318595 A1 | 12/2011 | Breiner et al. | |
| 2012/0046376 A1 | 2/2012 | Loccufier et al. | |
| 2012/0107625 A1 | 5/2012 | Smith et al. | |
| 2013/0123988 A1 | 5/2013 | Jariwala et al. | |
| 2013/0252178 A1 | 9/2013 | McLeod et al. | |
| 2013/0336884 A1 | 12/2013 | DeSimone et al. | |
| 2014/0084517 A1 * | 3/2014 | Sperry | B29C 67/0085 264/406 |
| 2014/0339741 A1 * | 11/2014 | Aghababaie | B29C 64/20 264/401 |
| 2015/0072293 A1 * | 3/2015 | DeSimone | B33Y 10/00 430/322 |
| 2015/0097315 A1 * | 4/2015 | DeSimone | G03F 7/0037 264/401 |
| 2015/0097316 A1 | 4/2015 | DeSimone et al. | |
| 2015/0102532 A1 | 4/2015 | DeSimone et al. | |
| 2015/0202805 A1 * | 7/2015 | Saruhashi | B33Y 10/00 264/1.36 |
| 2015/0231828 A1 | 8/2015 | El-Siblani et al. | |
| 2015/0231831 A1 | 8/2015 | El-Siblani | |
| 2015/0273632 A1 * | 10/2015 | Chen | B33Y 10/00 219/76.1 |
| 2015/0287169 A1 * | 10/2015 | Ueda | G06T 7/33 348/86 |
| 2015/0328839 A1 | 11/2015 | Willis et al. | |
| 2015/0331402 A1 | 11/2015 | Lin et al. | |
| 2015/0343745 A1 | 12/2015 | Pesek et al. | |
| 2015/0344682 A1 | 12/2015 | Ganapathiappan et al. | |
| 2015/0360419 A1 * | 12/2015 | Willis | B29C 64/264 425/174.4 |
| 2016/0046075 A1 | 2/2016 | Desimone et al. | |
| 2016/0059484 A1 | 3/2016 | Desimone et al. | |
| 2016/0059486 A1 | 3/2016 | Desimone et al. | |
| 2016/0059487 A1 | 3/2016 | Desimone et al. | |
| 2016/0122539 A1 | 5/2016 | Okamoto et al. | |
| 2016/0131974 A1 | 5/2016 | Abe et al. | |

(56) References Cited

U.S. PATENT DOCUMENTS

| | | | | |
|---|---|---|---|---|
| 2016/0136889 | A1* | 5/2016 | Rolland | B33Y 10/00 264/1.27 |
| 2016/0141535 | A1 | 5/2016 | Snaith et al. | |
| 2016/0160077 | A1 | 6/2016 | Rolland et al. | |
| 2016/0164031 | A1 | 6/2016 | Pieper et al. | |
| 2016/0167301 | A1 | 6/2016 | Cole et al. | |
| 2016/0193786 | A1 | 7/2016 | Moore et al. | |
| 2016/0200052 | A1 | 7/2016 | Moore et al. | |
| 2016/0271870 | A1* | 9/2016 | Brown, Jr. | B29C 64/286 |
| 2016/0271875 | A1* | 9/2016 | Brown, Jr. | B29C 64/386 |
| 2016/0303793 | A1* | 10/2016 | Ermoshkin | B33Y 10/00 |
| 2016/0303795 | A1 | 10/2016 | Liu et al. | |
| 2016/0325493 | A1 | 11/2016 | Desimone et al. | |
| 2016/0368221 | A1* | 12/2016 | Ueda | B29C 64/129 |
| 2017/0021562 | A1 | 1/2017 | El-Siblani et al. | |
| 2017/0022312 | A1* | 1/2017 | Liu | C09J 4/06 |
| 2017/0080641 | A1 | 3/2017 | El-Siblani | |
| 2017/0087769 | A1 | 3/2017 | Lancaster-Larocque et al. | |
| 2017/0106603 | A1* | 4/2017 | Pobihun | B33Y 30/00 |
| 2017/0113406 | A1* | 4/2017 | Chen | B33Y 30/00 |
| 2017/0113416 | A1 | 4/2017 | Desimone et al. | |
| 2017/0120515 | A1* | 5/2017 | Rolland | B33Y 10/00 |
| 2017/0151718 | A1 | 6/2017 | Rolland et al. | |
| 2017/0173881 | A1 | 6/2017 | Dachs, II et al. | |
| 2017/0182708 | A1* | 6/2017 | Lin | B33Y 10/00 |
| 2017/0210077 | A1 | 7/2017 | Ermoshkin et al. | |
| 2017/0239887 | A1 | 8/2017 | Rolland et al. | |
| 2017/0246660 | A1 | 8/2017 | Thompson et al. | |
| 2017/0246804 | A1 | 8/2017 | El-Siblani et al. | |
| 2017/0297099 | A1 | 10/2017 | Gibson et al. | |
| 2017/0334129 | A1 | 11/2017 | Ebert et al. | |
| 2017/0342182 | A1 | 11/2017 | Pesek et al. | |
| 2017/0369633 | A1 | 12/2017 | Caruso et al. | |
| 2018/0001552 | A1 | 1/2018 | Dachs, II et al. | |
| 2018/0015669 | A1 | 1/2018 | Moore et al. | |
| 2018/0044448 | A1 | 2/2018 | Moser et al. | |
| 2018/0071977 | A1 | 3/2018 | Tumbleston et al. | |
| 2018/0079865 | A1 | 3/2018 | Pyun et al. | |
| 2018/0100037 | A1 | 4/2018 | Pyun | |
| 2018/0105649 | A1 | 4/2018 | Pyun et al. | |
| 2018/0126630 | A1* | 5/2018 | Panzer | B29C 64/124 |
| 2018/0133959 | A1 | 5/2018 | Moore et al. | |

FOREIGN PATENT DOCUMENTS

| | | |
|---|---|---|
| JP | 2010030322 A | 2/2010 |
| WO | WO-0140866 A2 | 6/2001 |
| WO | WO 2014/126830 | 8/2014 |
| WO | WO-2015031227 A1 | 3/2015 |
| WO | WO-2015107066 A1 | 7/2015 |
| WO | WO-2017009368 A1 | 1/2017 |
| WO | WO-2017011533 A1 | 1/2017 |
| WO | WO-2017051084 A1 | 3/2017 |
| WO | WO-2017053783 A1 | 3/2017 |
| WO | WO-2017066546 A1 | 4/2017 |
| WO | WO-2017112483 A2 | 6/2017 |
| WO | WO-2017112682 A1 | 6/2017 |
| WO | WO-2017112751 A1 | 6/2017 |
| WO | WO-2017210298 A1 | 12/2017 |
| WO | WO-2017214007 A1 | 12/2017 |
| WO | WO-2018006018 A1 | 1/2018 |
| WO | WO-2018006029 A1 | 1/2018 |
| WO | WO-2018081053 A1 | 5/2018 |
| WO | WO-2018094131 A1 | 5/2018 |
| WO | WO-2018102341 A1 | 6/2018 |
| WO | WO-2018106472 A1 | 6/2018 |

OTHER PUBLICATIONS

Matyjaszewski and Xia, "Atom transfer radical polymerization," Chem. Rev., 101:2921-2990 (2001).

Otsu and Kuriyama, "Polymer design by iniferter technique in radical polymerization: synthesis of AB and ABA block copolymers containing random and alternating copolymer sequences," Polymer Journal, 17(1):97-104 (1985).

Benoit et al., "Development of a universal alkoxyamine for 'living' free radical polymerizations," J. Am. Chem. Soc., 121:3904-3920 (1999).

Green, "Industrial photoinitiators—a technical guide," CRC Press, © 2010 Taylor and Francis Group, LLC, 191 pages.

Moad et al., "Living radical polymerization by the RAFT process," Aust. J. Chem., 58:379-410 (2005).

"Organic photoinitiators," [online] [Retrieved on Aug. 4, 2014]; Retrieved from the Internet URL: http://www.sigmaaldrich.com/materials-science/material-science-products.html?TablePage=16374997; 1 page.

"Amine photochemical coinitiators," [online] [Retrieved on Aug. 4, 2014]; Retrieved from the Internet URL: http://www.sigmaaldrich.com/materials-science/material-science-products.html?TablePage=20204246; 2 pages.

"RAFT agents," [online] [Retrieved on Aug. 4, 2014]; Retrieved from the Internet URL: http://www.sigmaaldrich.com/materials-science/material-science-products.html?TablePage=103936134; 4 pages.

Kloxin et al., "Photodegradable hydrogels for dynamic tuning of physical and chemical properties," Science, 324:59-63 (2009).

Scott et al., "Two-color single-photon photoinitiation and photoinhibition for subdiffraction photolithography," Science, 324:913-917 (2009).

Chen, et al. Novel multifunctional hyperbranched polymeric photoinitiators with built-in amine coinitiators for UV curing. J. Mater. Chem., 17 (2007): 3389-3392.

Corrales, et al. Free radical macrophotoinitiators: an overview on recent advances. Journal of Photochemistry and Photobiology A: Chemistry, 159 (2003): 103-114.

Dendukuri, et al. Continuous-Flow Lithography for High-Throughput Microparticle Synthesis. Nature Materials, 5 (May 2006): 365-369.

Fairbanks, et al. Photoinitiated polymerization ofPEG-diacrylate with lithium phenyl-2,4,6-trimethylbenzoylphosphinate: polymerization rate and cytocompatibility. Biomaterials, 30 (2009): 6702-6707.

Gonsalvi, et al. Novel synthetic pathways for bis(acyl)phosphine oxide photoinitiators. Angew. Chem. Int. Ed., 51 (2012): 7895-7897.

Ikemura, et al. Design of a new dental adhesive-effect of a water-soluble sodium acyl phosphine oxide with crown ether on adhesion to dental hard tissues. Dental Materials Journal, 28.3 (2009): 267-276.

Lambert, et al. Design considerations for mask projection microstereolithography systems. (Jun. 22, 2016) [online] (retrieved from https://sffsymposium.engr.utexas.edu/Manuscripts/2013/2013-09-Lambert.pdf), 20 pages.

Lee, et al. Solvent Compatibility of Poly(dimethylsiloxane)-Based Microfluidic Devices, Anal. Chem. 75 (2003): 6544-6554.

Massey, L. Permeability Properties of Plastics and Elastomers—A Guide to Packaging and Barrier Materials. Published Jan. 1, 2003. pp. 1-5, 19-29.

McDonald, et al. Fabrication ofmicrofluidic systems in poly(dimethylsiloxane). Electrophoresis, 21(2000): 27-40.

Pan, et al. Rapid manufacturing in minutes: the development of a mask projection stereolithography process for high-speed fabrication. Proceedings of the ASME 2012 International Manufacturing Science and Engineering Conferences, Jun. 4-8, 2012, Notre Dame, Indiana, US, 10 pages.

Pinnau, et al. Gas and vapor properties of amorphous perfluorinated copolymer membranes based on 2,2-bistrifluoromethyl-4,5-difluoro-1,3-dioxole/tetrafluoroethylene. Journal of Membrane Science, 109: 125-133 (1996).

Temel, et al. Synthesis of main chain polymeric benzophenone photoinitiator via thiol-ene click chemistry and its use in free radical polymerization. J. Polym. Sci. A: Polym. Chem., 48 (2010): 5306-5312.

Unknown author, "DuPont™ Teflon® AF amorphous fluoroplastic resin," (Jun. 22, 2016) [online] (retrieved from http://www2.dupont.com/Teflon_Industrial/en_US/assets/downloads/h44587.pdf), 4 pages.

(56) References Cited

OTHER PUBLICATIONS

Unknown author, "Teflon™ AF amorphous fluoroplastic resins," (Jun. 22, 2016) [online] (retrieved from https://www.chemours.com/Teflon_Industrial/en_us/assets/downloads/teflon-af-product-information.pdf), 3 pages.
U.S. Appl. No. 14/711,703 Notice of Allowance dated Jun. 8, 2017.
U.S. Appl. No. 14/711,703 Office Action dated Apr. 22, 2016.
U.S. Appl. No. 14/711,703 Office Action dated Dec. 1, 2016.
U.S. Appl. No. 14/967,055 Office Action dated May 19, 2017.
U.S. Appl. No. 14/967,055 Office Action dated Nov. 1, 2017.
Wei, et al. A highly efficient polyurethane-type polymeric photoinitiator containing in-chain benzophenone and coinitiator amine for photopolymerization of PU prepolymers. Macromol. Chern. Phys., 207 (2006): 2321-2328.
Yang, et al. Synthesis of 1,6-hexanediol diacrylate, 2010.
Zhang, Teflon AF composite materials in membrane separation and molecular recognition in fluorous media. Ph.D. dissertation, University of Pittsburgh, 2013, 207 pages.
"Anilox." Wikipedia, Wikimedia Foundation, May 16, 2018, en.wikipedia.org/wiki/Anilox.
"Capabilities." Technical Coatings International Capabilities, Mar. 14, 2017, http://www.tciinc.com/capabilities/.
COENEN. Industry trends are boosting Jet Printing. 2015.
Co-pending U.S. Appl. No. 15/919,124, filed Mar. 12, 2018.
Co-pending U.S. Appl. No. 16/016,253, filed Jun. 22, 2018.
Co-pending U.S. Appl. No. 16/016,257, filed Jun. 22, 2018.
Co-pending U.S. Appl. No. 16/016,262, filed Jun. 22, 2018.
Co-pending U.S. Appl. No. 16/049,288, filed Jul. 30, 2018.
Deckers, et al. Additive Manufacturing of Ceramics: A Review, J. Ceram. Sci. Tech., 05 [04] 245-260 (2014).
Essemtec AG. Essemtec—Spider—Compact High Speed Jetter and Dispenser. YouTube Web Video. Published on Jul. 5, 2016. 2 pages. URL<https://www.youtube.com/watch?v=NpgBurid2wU.
Essemtec AG. Essemtec Scorpion—Versatile High Speed Jetting of Solder Paste and Glue. YouTube Web Video. Published on Nov. 13, 2014. 2 pages. URL<https://www.youtube.com/watch?v=SZ-Kq2Gkm5Y.
"Flexography." Wikipedia, Wikimedia Foundation, May 23, 2018, en.wikipedia.org/wiki/Flexography.
German, et al. Injection Molding of Metals and Ceramics. Metal Powder Industries Federation, 1997.
Houben. Equipment for printing of high viscosity liquids and molten metals. Universiteit Twente. Sep. 27, 2012.
Kyzen. Stencil Cleaning & Misprinted PCB Cleaners. 2018. http://www.kyzen.com/electronics-manufacturing-cleaning/stencils-and-misprints/.
Miller. Slot Die Coating Technology. Aug. 3, 2009.
Murata, et al. Photopolymerization-induced phase separation in binary blends of photocurable/linear polymers. Polymer. vol. 43, Issue 9, Apr. 2002, pp. 2845-2859.
Myiconnect007. Taiyo's Inkjet Solder Mask Applied with Meyer Burger's PIXDRO IP410 Printer. YouTube Web Video. Published on Feb. 13, 2015. 2 pages. URL<https://www.youtube.com/watch?v=jm_JteEkQWE.
"Reverse Roll Coating." Wikipedia, Wikimedia Foundation, Apr. 10, 2018, en.wikipedia.org/wiki/Reverse_roll_coating.
"Screen Printing." Wikipedia, Wikimedia Foundation, May 17, 2018, en.wikipedia.org/wiki/Screen_printing#1960s_to_present.
"Spin Coating." Wikipedia, Wikimedia Foundation, Apr. 10, 2018, en.wikipedia.org/wiki/Spin_coating.
Szczepanski, et al. A new approach to network heterogeneity: Polymerization Induced Phase Separation in photo-initiated, free-radical methacrylic systems. Polymer (Guildf). Sep. 28, 2012;53(21):4694-4701.
U.S. Appl. No. 14/967,055 Office Action dated Jul. 12, 2018.
Yang, H. et al. "High Viscosity Jetting System for 3d Reactive Inkjet Printing." (2013).

* cited by examiner

US 10,166,725 B2

THREE DIMENSIONAL PRINTING ADHESION REDUCTION USING PHOTOINHIBITION

CROSS-REFERENCE TO RELATED APPLICATIONS

This application claims the benefit under 35 U.S.C. § 119(e) of U.S. Patent Application No. 62/047,308, entitled "THREE DIMENSIONAL PRINTING ADHESION REDUCTION USING PHOTOINHIBITION", filed Sep. 8, 2014.

BACKGROUND

This specification relates to three dimensional (3D) printing using photopolymers.

Photopolymer-based 3D printers that use bottom-up illumination, project actinic radiation upwards through an optically transparent window into a vat of photoactive resin. As light passes through the resin, the photon flux is attenuated by absorption, and consequently the highest flux occurs at the resin-window interface. In the simplest model of photopolymerization, the polymerization rate is proportional to the square root of the photon flux, and accordingly the greatest polymerization rate also occurs at the resin-window interface. This phenomenon can result in adhesion between the window and formed polymer, in addition to adhesion between the printed part and the build tray, which lies further into the resin vat.

Photopolymer-based 3D printers that use bottom-up illumination typically address this issue by using a polydimethylsiloxane (PDMS) window, which is highly permeable to oxygen. During polymerization the oxygen dissolved in the window can inhibit polymerization at the window-resin interface, and can reduce adhesion between the polymer and window. However, the oxygen can be depleted from the PDMS, and polymerization can then subsequently occur at the interface. In addition, the polymerization is generally only inhibited immediately adjacent to the PDMS.

SUMMARY

This specification describes technologies relating to three dimensional (3D) printing adhesion reduction using photoinhibition, and more specifically, this specification describes using two light sources with different wavelengths to respectively control a photopolymerization process using a photoinitiator, and a photoinhibition process by photochemically generating a species that inhibits the polymerization.

In general, one or more aspects of the subject matter described in this specification can be embodied in one or more methods that include: moving a build plate in a vat of liquid including a photoactive resin; creating a photoinhibition layer within the liquid directly adjacent a window of the vat by directing a first light through the window into the liquid, the first light having a first wavelength selected to produce photoinhibition; and creating a solid structure on the build plate from the photoactive resin within a photoinitiation layer of the liquid by directing a second light through the window into the liquid, where the photoinitiation layer resides between the photoinhibition layer and the build plate, and the second light has a second wavelength different than the first wavelength. Other embodiments of this aspect include corresponding systems, apparatus, and computer program products.

The method(s) can further include changing a thickness of the photoinhibition layer based on the solid structure to be created. Creating the solid structure on the build plate can include iteratively directing a varying pattern of the second light through the window and raising the build plate, and changing the thickness of the photoinhibition layer can include adjusting an intensity of the first light during the creation of the solid structure.

The liquid can include a first photon absorbing species and a second photon absorbing species, creating the solid structure on the build plate can include iteratively directing a varying pattern of the second light through the window and raising the build plate, and the method(s) can include: changing a thickness of the photoinitiation layer, the photoinhibition layer, or both during the creation of the solid structure by adjusting an amount of the first photon absorbing species, the second photon absorbing species, or both. The first photon absorbing species and the second photon absorbing species can each be a light blocking dye.

The liquid can include three species, and the method(s) can include using camphorquinone (CQ) as a photoinitiator, ethyl-dimethyl-amino benzoate (EDMAB) as a co-initiator, and thiram tetraethylthiuram disulfide (TEDS) as a photoinhibitor. Creating the photoinhibition layer can include illuminating a bottom region of the vat in proximity to the window with uniform light coverage from a photoinhibiting light source generating the first light at a wavelength of approximately 365 nm, and creating the solid structure on the build plate can include illuminating a portion of the photoactive resin within the photoinitiation layer using a projector to deliver a pattern of the second light at a wavelength of approximately 460 nm through the photoinhibition layer and into the photoinitiation layer. In addition, in some implementations, the liquid can include tetrabenzylthiuram disulfide as a photoinhibitor.

Creating the photoinhibition layer can include illuminating a bottom region of the vat in proximity to the window using a dual-wavelength projector generating the first light at the first wavelength, and creating the solid structure on the build plate can include illuminating a portion of the photoactive resin within the photoinitiation layer using the dual-wavelength projector to deliver a pattern of the second light at the second wavelength through the photoinhibition layer and into the photoinitiation layer. Creating the photoinhibition layer can include illuminating a bottom region of the vat in proximity to the window using a planar display directly below the window, and creating the solid structure on the build plate can include illuminating a portion of the photoactive resin within the photoinitiation layer using the planar display directly below the window. Moreover, the planar display can include a discrete LED (Light Emitting Diode) array.

In addition, one or more aspects of the subject matter described in this specification can be embodied in one or more systems that include: a vat capable of holding a liquid including a photoactive resin, where the vat includes a window; a build plate configured and arranged to move within the vat during three dimensional printing of a solid structure on the build plate; and one or more light sources configured and arranged with respect to the window to (i) create a photoinhibition layer within the liquid directly adjacent the window by directing a first light through the window into the liquid, the first light having a first wavelength selected to produce photoinhibition, and (ii) create the solid structure on the build plate from the photoactive resin within a photoinitiation layer of the liquid by directing a second light through the window into the liquid, where the photoinitiation layer resides between the photoinhibition layer and the build plate, and the second light has a second wavelength different than the first wavelength.

The system(s) can include a controller configured to change a thickness of the photoinhibition layer based on the solid structure to be created. The controller can be configured to move the build plate and direct a varying pattern of the second light through the window to create the solid structure, and the controller can be configured to change the thickness of the photoinhibition layer by adjusting an intensity of the first light during the creation of the solid structure.

The system(s) can include a controller configured to move the build plate and direct a varying pattern of the second light through the window to create the solid structure, and the controller can be configured to change a thickness of the photoinitiation layer, the photoinhibition layer, or both during the creation of the solid structure by adjusting an amount of a first photon absorbing species, a second photon absorbing species, or both. The first photon absorbing species and the second photon absorbing species can each be a light blocking dye.

The one or more light sources can be configured and arranged to illuminate a bottom region of the vat in proximity to the window with uniform light coverage from a photoinhibiting light source generating the first light at a wavelength of approximately 365 nm, and the one or more light sources can include a projector configured to illuminate a portion of the photoactive resin within the photoinitiation layer by delivering a pattern of the second light at a wavelength of approximately 460 nm through the photoinhibition layer and into the photoinitiation layer to create the solid structure on the build plate.

The one or more light sources can include a dual-wavelength projector configured to generate the first light at the first wavelength to illuminate a bottom region of the vat in proximity to the window, and illuminate a portion of the photoactive resin within the photoinitiation layer by delivering a pattern of the second light at the second wavelength through the photoinhibition layer and into the photoinitiation layer to create the solid structure on the build plate.

The one or more light sources can include a planar display positioned directly below the window, and the planar display can be configured to generate the first light at the first wavelength to illuminate a bottom region of the vat in proximity to the window, and illuminate a portion of the photoactive resin within the photoinitiation layer to create the solid structure on the build plate. Moreover, the planar display can include a discrete LED (Light Emitting Diode) array.

Particular embodiments of the subject matter described in this specification can be implemented to realize one or more of the following advantages. Adhesion at the resin-window interface in a photopolymer-based 3D printer can be reduced, thereby reducing or eliminating the undesirable force that may otherwise be needed to separate the window and polymer. This can result in a reduced failure rate and improved 3D prints. Moreover, the region of inhibited polymerization can be made significantly larger than that generated using a PDMS window. Thus, the forces in the normal direction, which are produced by Stefan adhesion during separation of the 3D printed part and a traditional PDMS window, can be avoided.

Unlike a conventional PDMS printer, a sliding or rotational mechanism need not be used to separate the cured polymer and window, which can reduce the complexity and cost of the 3D printer, and/or increase the build area of the 3D printer relative to the physical size of the 3D printer. However, in some implementations, a sliding or rotational mechanism can be used. Moreover, increased print speeds can be achieved, and print accuracy can be increased due to fewer mechanical forces being applied to the print. Thus, increased reliability can be achieved in both the print and the print mechanism by eliminating mechanical points of failure (e.g., over-adhesion).

Moreover, by not being restricted to a PDMS window, the choice of window materials expands to include standard optical window materials, such as PMMA (polymethyl methacrylate) or glass, which would not usually be possible due to strong adhesion. This introduces further potential for material and manufacturing cost savings. In addition, as the resin does not swell into glass and hard plastic substances, more latitude is imparted to photopolymer formulation. This is in contrast with PDMS, where the photopolymer resins can swell into the PDMS, polymerize, and phase separate, thereby causing the PDMS to become hazy, which significantly diminishes light transmission through the PDMS, and increases undesirable light scattering, de-focusing the projector pattern.

The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1:
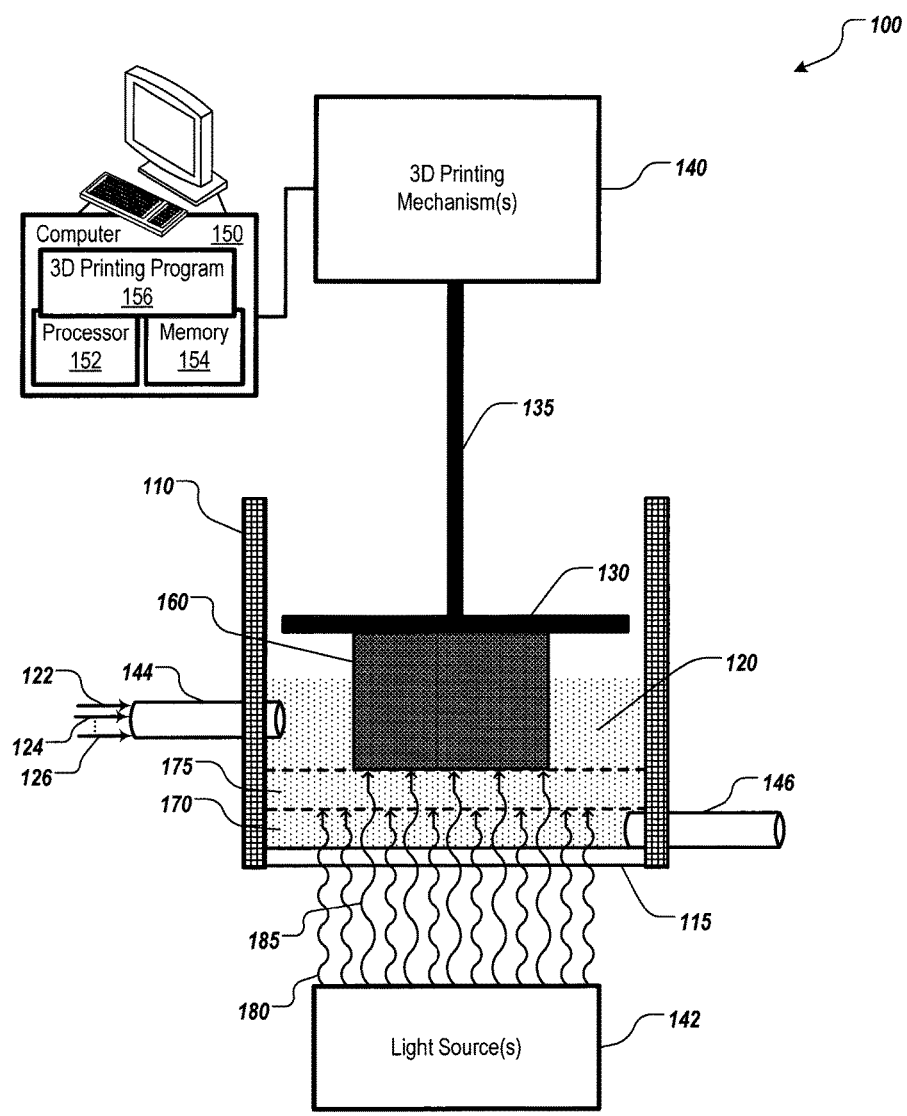
FIG. 1 shows an example of a 3D printing system.

FIG. 1 shows an example of a 3D printing system 100. The system 100 includes a vat or reservoir 110 to hold a liquid 120, which includes one or more photoactive resins. The vat 110 includes a window 115 in its bottom through which illumination is transmitted to cure a 3D printed part 160. The 3D printed object 160 is shown as a block, but as will be appreciated, a wide variety of complicated shapes can be 3D printed. In addition, although systems and techniques are described herein in the context of reducing adhesion forces at a window at a bottom of a liquid filled vat, it will be appreciated that other configurations are possible for reducing adhesion forces at a window-resin interface when 3D printing using photopolymers.

The object 160 is 3D printed on a build plate 130, which is connected by a rod 135 to one or more 3D printing mechanisms 140. The printing mechanism(s) 140 can include various mechanical structures for moving the build plate 130 within the vat 110. This movement is relative movement, and thus the moving piece can be build plate 130, the vat 110, or both, in various implementations. In some implementations, a controller for the printing mechanism(s) 140 is implemented using integrated circuit technology, such as an integrated circuit board with embedded processor and firmware. Such controllers can connect with a computer or computer system. In some implementations, the system 100 includes a programmed computer 150 that connects to the printing mechanism(s) 140 and operates as the controller for the system 100.

A computer 150 includes a processor 152 and a memory 154. The processor 152 can be one or more hardware processors, which can each include multiple processor cores. The memory 154 can include both volatile and non-volatile memory, such as Random Access Memory (RAM) and Flash RAM. The computer 150 can include various types of computer storage media and devices, which can include the memory 124, to store instructions of programs that run on the processor 152. For example, a 3D printing program 156 can be stored in the memory 154 and run on the processor 152 to implement the techniques described herein.

One or more light sources 142 are positioned below the window 115 and are connected with the computer 150 (or other controller). The light source(s) direct a first light 180 and a second light 185 into the liquid 120 through the window 115. The first light 180 has a first wavelength selected to produce photoinhibition and creates a photoinhibition layer 170 within the liquid 120 directly adjacent the window 115. The second light 185 has a second wavelength different than the first wavelength, which is used to create the 3D structure 160 on the build plate 130 by curing the photoactive resin in the liquid 120 within a photoinitiation layer 175, in accordance with a defined pattern or patterns. In addition, the one or more light sources 142 can be a dual wavelength illumination source device or separate illumination devices, as described in further detail below.

The build plate 130 starts at a position near the bottom of the vat 110, and a varying pattern of the second light 185 is then directed through the window 115 to create the solid structure 160 as the build plate 130 is raised out of the vat. In addition, the computer 150 (or other controller) can change a thickness of the photoinitiation layer 175, the photoinhibition layer 170, or both. In some implementations, this change in layer thickness(es) can be done for each new 3D print based on the type of 3D print to be performed. The layer thickness can be changed by changing the strength of the light source, the exposure time, or both. In some implementations, this change in layer thickness(es) can be performed during creation of the solid structure 160 based on one or more details of the structure 160 at one or more points in the 3D print. For example, the layer thickness can be changed to increase 3D print resolution in the dimension that is the direction of the movement of the build plate 130 relative to the vat 110 (e.g., to add greater Z details) in layers that may require it.

In some implementations, a controller (e.g., computer 150) adjusts an amount of a first species 122, a second species 124, and potentially one or more additional species 126 in the liquid 120. These species can be delivered to the vat 110 using an inlet 144 and evacuated from the vat 110 using an outlet 146. In some implementations, the 3D printing system 100 can include one or more reservoirs in addition to the vat 110 to hold input and output flows for the vat 110.

The species 122, 124, 126 can include photon absorbing species, which can include light blocking dyes. In addition, the species 122, 124, 126 are selected in accordance with the wavelengths of the first and second lights 180, 185. In some implementations, a first species 122 is a photoinitiator, such as camphorquinone (CQ), a second species 124 is a co-initiator, such as ethyl-dimethyl-amino benzoate (EDMAB), and a third species 126 is a photoinhibitor, such as tetraethylthiuram disulfide (TEDS). By introducing a third species that absorbs light at the inhibiting wavelength, the depth of the inhibition can be controlled such that polymerization does not occur at the resin-window interface, but only occurs further into the resin vat 110. This allows parts to be rapidly printed without adhesion between the printed part 160 and the window 115. In addition, in some implementations, triethylene glycol dimethacrylate can be used as a monomer, and 2-(2H-benzotriazol-2-yl)-4,6-ditertpentylphenol and Martius yellow can be used as light blocking dyes.

In some implementations, the thickness of the photoinitiation layer 175, the photoinhibition layer 170, or both, can be changed by adjusting an intensity of the first light 180, the second light 185, or both. In addition, an opto-mechanical configuration to deliver dual-wavelength exposure can be achieved in numerous ways. For example, a dual-wavelength projector 142 can be used as both the photoinitiating and photoinhibiting light source. Other configurations include, but are not limited to, the use of planar displays directly below the window-resin interface. Such a display can be mask-based, such as a liquid crystal display (LCD) device, or light-emitting, such as a discrete light emitting diode (LED) array device. In some implementations, a separate photoinhibiting light source is used to produce uniform light coverage of the bottom of the resin vat.

Figure 2:
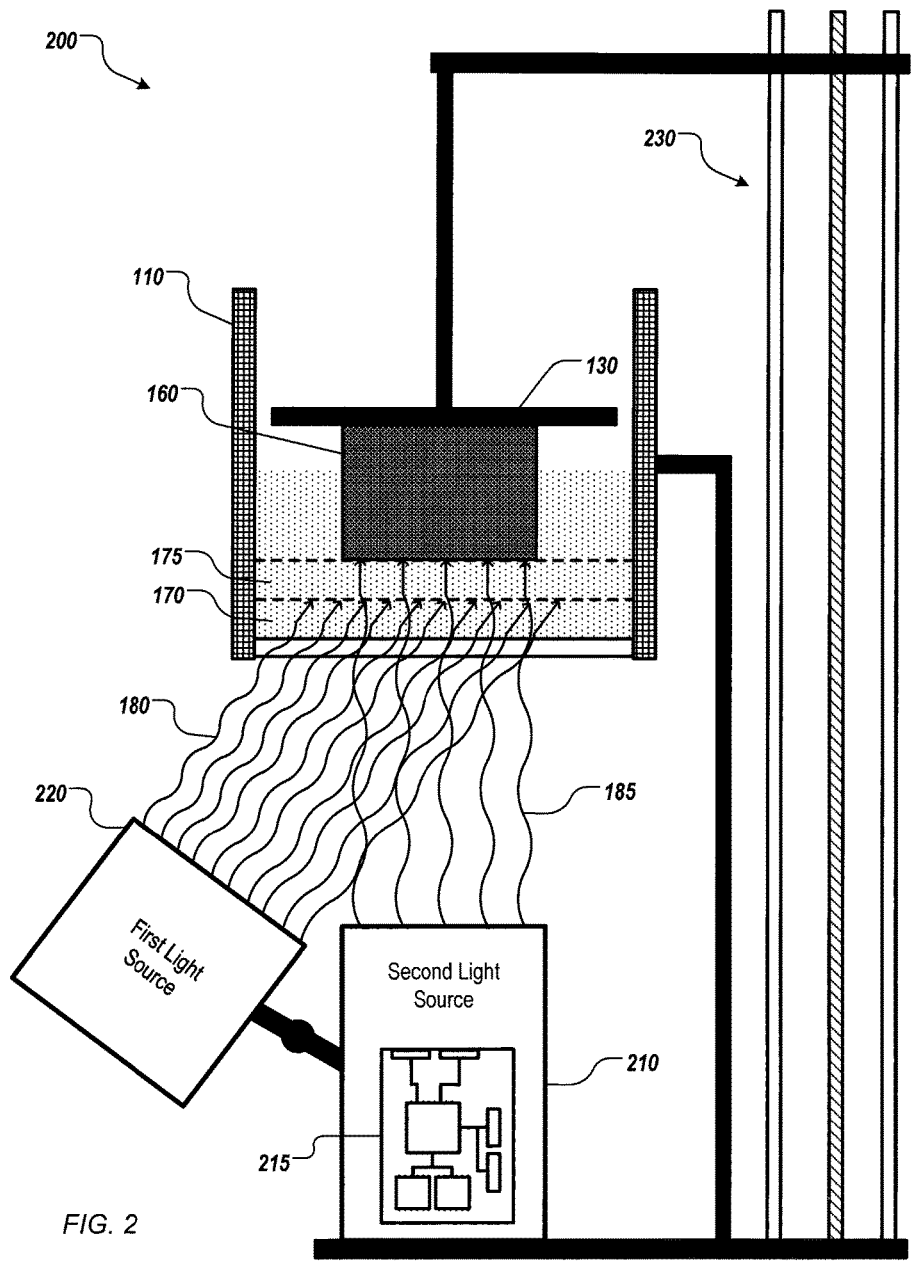
FIG. 2 shows another example of a 3D printing system.

FIG. 2 shows another example of a 3D printing system 200. In the system 200, a screw-based mechanism 230 is used to control the height of the build plate 130 within the vat 110, a separate non-patterned light source 220, such as a collimated beam or a planar waveguide, is used as a first light source to provide even coverage of the first light 180 across the window-resin interface, and a pattern delivery projector 210, such as a digital light processing (DLP) projector, is used as a second light source to illuminate a portion of the photoactive resin within the photoinitiation layer 175 by delivering a pattern of the second light 185 through the photoinhibition layer 170 and into the photoinitiation layer 175 to create the solid structure 160 on the build plate 130. In the example shown, the controller for the pattern generation and the screw-based mechanism 230 is implemented using a circuit board 215 with integrated circuitry thereon, including an embedded processor and firmware.

In some implementations, the separate light source 220 can be a patterned light source 220, such as a DLP projector, rather than a flood source. Thus, the first light 180 can also be patterned light. The controller for a separate patterned light source 220 can be a dedicated controller, or it can be a controller that is shared with a patterned second light source 210. Moreover, in various implementations, the screw-based mechanism 230 and/or the printing mechanism(s) 140 can employ a stepwise separation mechanism or a continuous separation mechanism.

For example, the photoinhibition process can be used in a continuous printing process where the printed part in lifted at a constant rate (or a pseudo constant rate) which pulls new resin into the inhibited layer. Alternatively, to reduce the forces applied to delicate structures from the Stefan adhesive force, the window (or build head) can be translated to a second region of the build plate where the gap between the printed part and the tray is considerable greater, and then raised, such that printing is conducted in a stepwise process.

Figure 3:
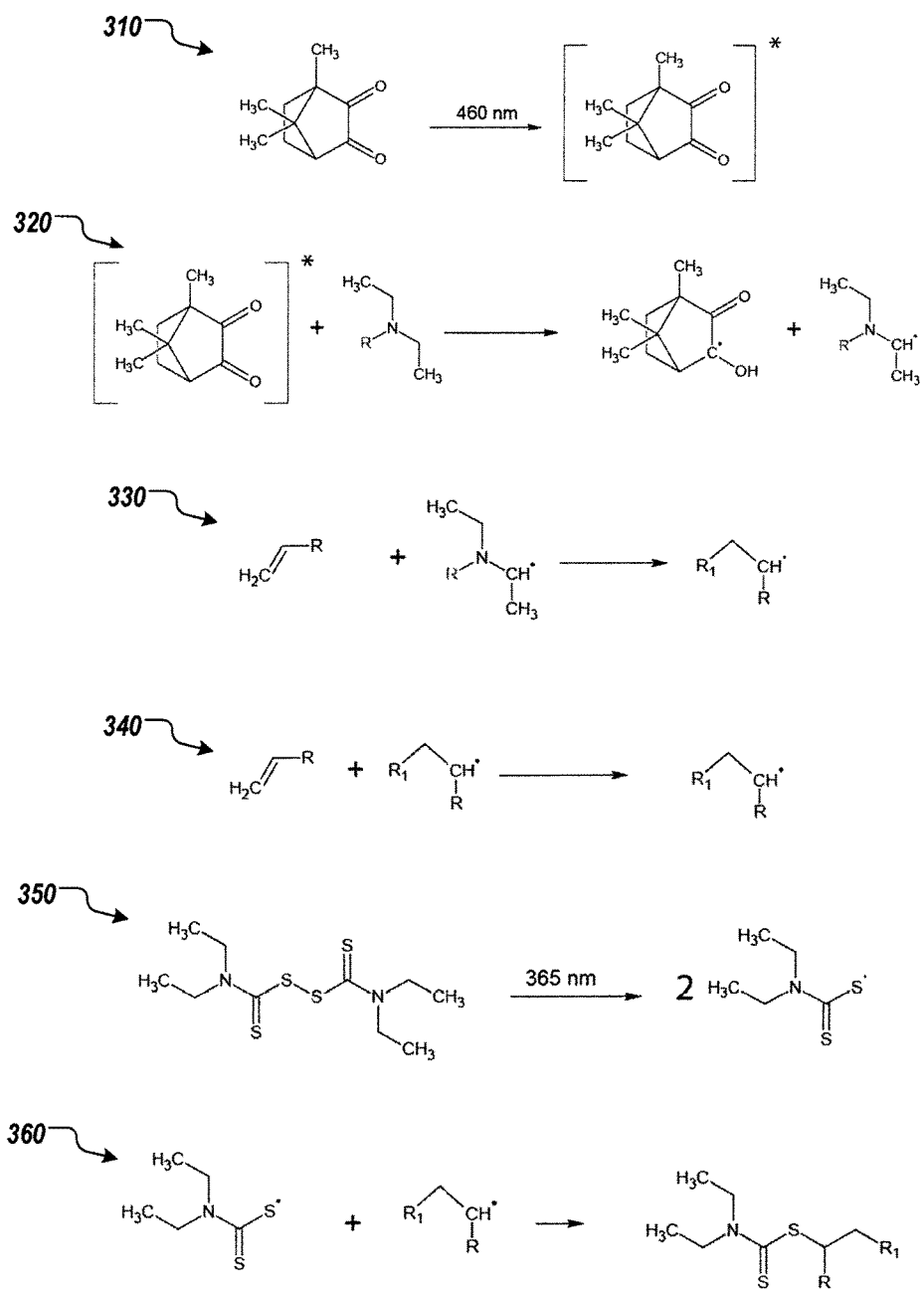
FIG. 3 shows an example of a chemical scheme of photoinitiation and photoinhibition.

In some implementations, the photoinitiation wavelength is approximately 460 nm, and the photoinhibition wavelength is approximately 365 nm. FIG. 3 shows an example of a chemical scheme of photoinitiation and photoinhibition, where $R_1$ represents the growing polymer chain. As shown at 310, upon irradiation with blue light (approximately 460 nm) the CQ enters an excited state, undergoes a Noorish type II reaction, and abstracts a hydrogen from the EDMAB generating a radical at 320. This radical species can then initiate at 330 and polymerize at 340 vinylic monomers present. Concurrently, upon irradiation with UV light (approximately 365 nm) TEDS undergoes homolytic cleavage generating two sulfanylthiocarbonyl radicals at 350. Addition of sulfanylthiocarbonyl radicals to double bonds is typically slow, and these radicals tend to undergo combination with other radicals quenching polymerization at 360. By controlling the relative rates of reactions 340 and 360, the overall rate of polymerization can be controlled. This process can thus be used to prevent polymerization from occurring at the resin-window interface and control the rate at which polymerization takes place in the direction normal to the resin-window interface.

A wide variety of other species and irradiation conditions can be used for the photoinhibition and photoinitiation processes. Non-limiting examples of the photoinitiator contemplated include benzophenones, thioxanthones, anthraquinones, benzoylformate esters, hydroxyacetophenones, alkylaminoacetophenones, benzil ketals, dialkoxyacetophenones, benzoin ethers, phosphine oxides acyloximino esters, alphahaloacetophenones, trichloromethyl-S-triazines, titanocenes, dibenzylidene ketones, ketocoumarins, dye sensitized photoinitiation systems, maleimides, and mixtures thereof. The photoinitiator may be used in amounts ranging from about 0.01 to about 25 weight percent (wt %) of the composition, and more preferably from about 0.1 to about 3.0 wt % of the composition. Non-limiting examples of co-initiators would include: primary, secondary, and tertiary amines; alcohols, and thiols.

Photoinitiators contemplated include: 1-hydroxy-cyclohexyl-phenyl-ketone (Irgacure™ 184; BASF, Hawthorne, N.J.); a 1:1 mixture of 1-hydroxy-cyclohexyl-phenyl-ketone and benzophenone (Irgacure™ 500; BASF); 2-hydroxy-2-methyl-1-phenyl-1-propanone (Darocur™ 1173; BASF); 2-hydroxy-1-[4-(2-hydroxyethoxy)phenyl]-2-methyl-1-propanone (Irgacure™ 2959; BASF); methyl benzoylformate (Darocur™ MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (Irgacure™ 754; BASF); alpha,alpha-dimethoxy-alpha-phenylacetophenone (Irgacure™ 651; BASF); 2-benzyl-2-(dimethylamino)-1-[4-(4-morpholinyl)-phenyl]-1-butanone (Irgacure™ 369; BASF); 2-methyl-1-[4-(methylthio)phenyl]-2-(4-morpholinyl)-1-propanone (Irgacure™ 907; BASF); a 3:7 mixture of 2-benzyl-2-(dimethylamino)-1-[4-(4-morpholinyl) phenyl]-1-butanone and alpha,alpha-dimethoxy-alpha-phenylacetophenone per weight (Irgacure™ 1300; BASF); diphenyl-(2,4,6-trimethylbenzoyl)phosphine oxide (Darocur™ TPO; BASF); a 1:1 mixture of diphenyl-(2,4,6-trimethylbenzoyl)-phosphine oxide and 2-hydroxy-2-methyl-1-phenyl-1-propanone (Darocur™ 4265; BASF); phenyl bis(2,4,6-trimethylbenzoyl)phosphine oxide, which may be used in pure form (Irgacure™ 819; BASF, Hawthorne, N.J.) or dispersed in water (45% active, Irgacure™ 819DW; BASF); 2:8 mixture of phosphine oxide, phenyl bis(2,4,6-trimethyl benzoyl) and 2-hydroxy-2-methyl-1-phenyl-1-propanone (Irgacure™ 2022; BASF); Irgacure™ 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (Irgacure™ 784; BASF); (4-methylphenyl) [4-(2-methylpropyl) phenyl]-iodonium hexafluorophosphate (Irgacure™ 250; BASF); 2-(4-methylbenzyl)-2-(dimethylamino)-1-(4-morpholinophenyl)-butan-1-one (Irgacure™ 379; BASF); 4-(2-hydroxyethoxy)phenyl-(2-hydroxy-2-propyl)ketone (Irgacure™ 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2-hydroxy-2-methyl-1-phenyl-propanone (Irgacure™ 1700; BASF); 4-Isopropyl-9-thioxanthenone; and mixtures thereof.

Co-initiators may enhance the polymerization rate in some cases, and those contemplated include: isoamyl 4-(dimethylamino)benzoate, 2-ethylhexyl 4-(dimethylamino) benzoate; ethyl 4-(dimethylamino)benzoate; 3-(dimethylamino)propyl acrylate; 2-(dimethylamino)ethyl methacrylate; 4-(dimethylamino)benzophenones, 4-(diethylamino)benzophenones; 4,4'-Bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (Sartomer); CN371 (Sartomer), CN373 (Sartomer), Genomer 5142 (Rahn); Genomer 5161 (Rahn); Genomer(5271 (Rahn); Genomer 5275 (Rahn), and TEMPIC (Bruno Boc, Germany). The co-initiators may be used in amounts ranging from about 0.0 to about 25 weight percent (wt %) of the composition, and more preferably from about 0.1 to about 3.0 wt % of the composition.

A wide variety of radicals are known which tend to preferentially terminate growing polymer radicals, rather than initiating polymerizations. Classically, ketyl radicals are known to terminate rather than initiate photopolymerizations. Most controlled radical polymerization techniques utilize a radical species that selectively terminates growing radical chains. Examples would include the sulfanylthiocarbonyl and other radicals generated in photoiniferter polymerizations; the sulfanylthiocarbonyl radicals used in reversible addition-fragmentation chain transfer polymerization; and the nitrosyl radicals used in nitroxide mediate polymerization. Other non-radical species that can be generated to terminate growing radical chains would include the numerous metal/ligand complexes used as deactivators in atom-transfer radical polymerization (ATRP). Therefore, non-limiting examples of the photoinhibitor include thiocarbamates, xanthates, dithiobenzoates, photoinititators that generate ketyl and other radicals that tend to terminate growing polymer chains radicals (i.e., camphorquinone and benzophenones), ATRP deactivators, and polymeric versions thereof. The photoinhibitor may be used in amounts ranging from about 0.01 to about 25 weight percent (wt %) of the composition, and more preferably from about 0.1 to about 3.0 wt % of the composition.

Photoinhibitors contemplated include: zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide; tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-[(dodecylsulfanylthiocarbonyl)sulfanyl]pentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl]trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio]propionate; 1-Succinimidyl-4-cyano-4-[N-methyl-N-(4-pyridyl)carbamothioylthio]pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl)carbamodithioate; 2-Cyanopropan-2-yl N-methyl-N-(pyridin-4-yl)carbamodithioate; and Methyl 2-[methyl(4-pyridinyl)carbamothioylthio]propionate.

A wide variety and non-limiting list of monomers that can be used include monomeric, dendritic, and oligomeric forms of acrylates, methacrylates, vinyl esters, styrenics, other vinylic species, and mixtures thereof. Monomers contemplated include: hydroxyethyl methacrylate; n-Lauryl acrylate; tetrahydrofurfuryl methacrylate; 2,2,2-trifluoroethyl methacrylate; isobornyl methacrylate; polypropylene glycol monomethacrylates, aliphatic urethane acrylate (i.e., Rahn Genomer 1122); hydroxyethyl acrylate; n-Lauryl methacrylate; tetrahydrofurfuryl acrylate; 2,2,2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethyleneglycol diacrylate; triethylene glycol dimethacrylate; tetrathyleneglycol diacrylate; tetrathylene glycol dimethacrylate; neopentyldimethacrylate; neopentylacrylate; hexane dioldimethacylate; hexane diol diacrylate; polyethylene glycol 400 dimethacrylate; polyethylene glycol 400 diacrylate; diethylglycol diacrylate; diethylene glycol dimethacrylate; ethyleneglycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; and ditrimethylolpropane tetraacrylate.

Dyes can be used to both attenuate light and to transfer energy to photoactive species increasing the sensitivity of the system to a given wavelength for either or both photoinitiation and photoinhibition processes. The concentration of the chosen dye is highly dependent on the light absorption properties of the given dye and ranges from about 0.001 to about 5 weight percent (wt %) of the composition. Useful classes of dyes include compounds commonly used as UV absorbers for decreasing weathering of coatings including, such as, 2-hydroxyphenyl-benzophenones; 2-(2-hydroxyphenyl)-benzotriazoles; and 2-hydroxyphenyl-s-triazines. Other useful dyes include those used for histological staining or dying of fabrics. A non-limiting list would include: Martius yellow, Quinoline yellow; Sudan red, Sudan I, Sudan IV, eosin, eosin Y, neutral red, and acid red. Pigments can also be used to scatter and attenuate light.

The general concept is not necessarily limited to radical based photopolymerizations, and can also be applied to cationic photopolymerizations of allylic, epoxide, oxetane, and other monomers. In such implementations, cationic photoinitiators such as triphenylsulphonium salts, diphenyliodonium salts, or diaryliodonium salts would be used to generate a propagating cationic center and polymerize the monomer. Photoinhibition would be accomplished using a photobase generator such as, PL-1, or PL-2, Irgacure 369, or Irgacure 907 (BASF products), to neutralize the propagating cation. Alternatively, an alcohol or other chain transfer agent can be generated which would significantly delay gelation. Such a process can be accomplished using functional groups that are liberated by the photochemical removal of ortho-nitrobenzyl groups or fluorenylmethyloxycarbonyl carbamate.

Figure 4:
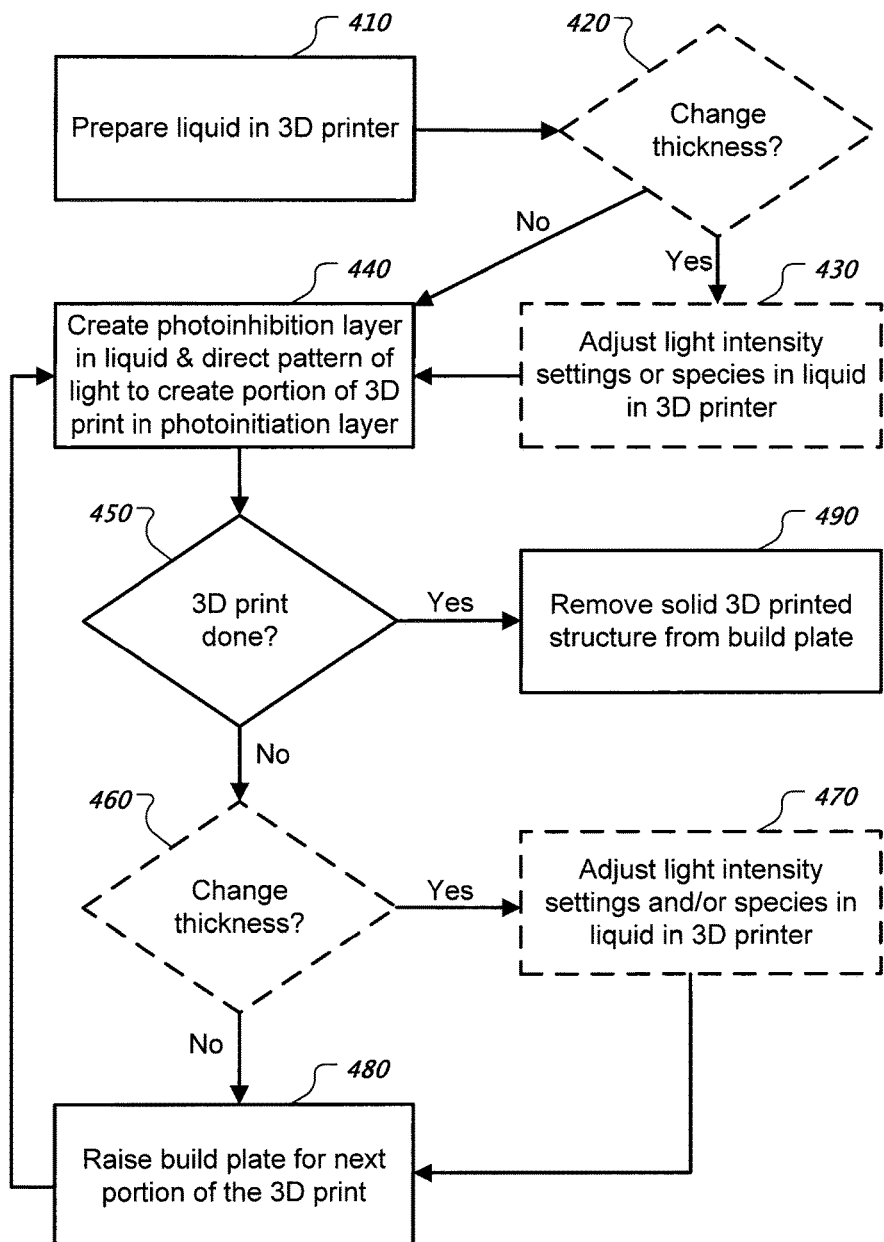
FIG. 4 shows an example of a process for 3D printing.
Like reference numbers and designations in the various drawings indicate like elements.

FIG. 4 shows an example of a process for 3D printing. At 410, liquid is prepared in a 3D printer for a 3D print. For example, a mixture of triethyleneglycol dimethacrylate (46% wt.), Genomer™ 1122 (Rahn, 38% wt.), Genomer™ 4230 (Rahn, 15% wt.) can be prepared in the resin reservoir 110 in the 3D printing system 200, and disulfiram (68 µM), camphorquinone (135 µM), ethyl 4-dimethylaminobenzoate (43 µM) can be added to this mixture. Other initial preparations are also possible.

In some implementations, a check can be made at 420 regarding any desired changes in thickness of the photoinhibition layer, the photoiniation layer, or both, for the 3D print to be performed. For example, the nature of the part to be printed or the nature of the liquid mixture prepared for the 3D print can be used to determine a thickness of the photoinhibition layer. At 430, one or more light intensity settings for the 3D printer or one or more species in the liquid mixture can be adjusted to effect layer thickness change(s).

At 440, the photoinhibition layer is created within the liquid mixture using a first light and a pattern of second light is directed through the photoinhibition layer to create a solid structure on the build plate from the photoactive resin within a photoinitiation layer of the liquid mixture. For example, the reservoir 110 can be illuminated with a 365 nm LED at a light intensity of 43 mW/cm2 (as measured by a 365 nm probe). In some implementations, this illumination using the first light is ongoing and unchanging during the 3D print. At the same time, a 2-D pattern can be projected into the reservoir bottom using a DLP projector with a light intensity of the approximately 460 nm LED light source being 19 mW/cm2, as measured by a G&R labs radiometer using a 420 nm probe. The build plate is then moved through the liquid, with each successive layer of the structure being added, until the 3D print is done at 450.

At 480, the build plate is raised for the next portion of the 3D print, and the second light is iteratively directed in a varying pattern at 440 to build the structure from the resin cured from the liquid. In some implementations, the build plate is initially placed in the bottom of the reservoir and retracted at a rate of 54 mm per hour. In some implementations, the rate of retraction is faster than this. In some implementations, the rate of retraction is essentially continuous, as noted above, and so steps 440 and 480 occur concurrently. Once the 3D print is completed, the solid 3D printed structure is removed from the build plate at 490. In some implementations, this removal is performed by an automatic mechanism of the 3D printer.

In addition, in some implementations, a thickness of the photoinhibition layer, the photoiniation layer, or both, can be changed during the 3D printing process. At 460, a check can be made as to whether a change is needed for the next portion of the 3D print. For example, a thickness of the photoinitiation layer can be changed for one or more layers of the 3D object being printed. In this case, one or more light intensity settings for the 3D printer and/or one or more species in the liquid mixture can be adjusted to effect layer thickness change(s) at 470.

In some embodiments, a 3D printer will include sensors and be designed to modify its operations based on feedback from these sensors. For example, the 3D printer can use closed loop feedback from sensors in the printer to improve print reliability. Such feedback sensors can include one or more strain sensors on the rod holding the build platform to detect if adhesion has occurred and stop and/or adjust the print, and one or more sensors to detect polymer conversion, such as a spectrometer, a pyrometer, etc. These sensors can be used to confirm that the 3D printing is proceeding correctly, and/or to determine if the resin has been fully cured before the 3D printer proceeds to the next layer. Moreover, in some embodiments, one or more cameras can be used along with computer vision techniques to check that the print is proceeding as expected. Such cameras can be positioned under the print vat and look at the output (3D print) compared to the input (mask image).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by, and/or under the control of, one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A system for printing a three-dimensional (3D) object, comprising:
    a vat capable of holding a liquid comprising a photoactive resin, wherein the vat includes a window;
    a build plate configured and arranged to move relative to the vat during printing of the 3D object on the build plate;
    one or more light sources configured and arranged with respect to the window to direct a first light and a second light through the window into the liquid, wherein the first light has a first wavelength that is configured to induce photoinhibition in the photoactive resin, and wherein the second light has a second wavelength that is configured to induce photoinitiation in the photoactive resin, wherein the second wavelength is different than the first wavelength; and
    a controller that is programed to (a) direct the one or more light sources to expose the liquid to the first light and second light at a first set of intensities and exposure times to yield (i) a first photoinhibition layer having a first thickness and (ii) a first photoinitiation layer, and (b) direct the one or more light sources to expose the liquid to the first light and second light at a second set of intensities and exposure times to yield (i) a second photoinhibition layer having a second thickness and (ii) a second photoinitiation layer, wherein the first set of intensities and exposure times and the second set of intensities and exposure times are selected such that the first thickness is different than the second thickness, thereby printing at least a portion of the 3D object.

2. The system of claim 1, wherein the controller is programmed to subject the build plate to movement and direct a varying pattern of the second light through the window to print the 3D object.

3. The system of claim 1, wherein the liquid comprises camphorquinone (CQ) as a photoinitiator, ethyl-dimethylamino benzoate (EDMAB) as a co-initiator, and thiram tetraethylthiuram disulfide (TEDS) as a photoinhibitor.

4. The system of claim 1, wherein the liquid comprises a photoinhibitor comprising tetrabenzylthiuram disulfide.

5. The system of claim 1, wherein the one or more light sources comprise a dual-wavelength projector configured to (i) generate the first light at the first wavelength to illuminate a bottom region of the vat in proximity to the window, and (ii) illuminate the photoactive resin by delivering a pattern of the second light at the second wavelength, to yield the first photoinhibition layer, the first photoinitiation layer, the second photoinhibition layer, and the second photoinitiation layer.

6. The system of claim 1, wherein the one or more light sources comprise a planar display positioned directly below the window, and wherein the planar display is configured to (i) generate the first light at the first wavelength to illuminate a bottom region of the vat in proximity to the window, and (ii) illuminate the photoactive resin by delivering the second light at the second wavelength, to yield the first photoinhibition layer, the first photoinitiation layer, the second photoinhibition layer, and the second photoinitiation layer.

7. The system of claim 6, wherein the planar display comprises a discrete light emitting diode array.

8. The system of claim 1, wherein the controller is programmed to subject the build plate or the vat to movement, thereby directing the build plate along a direction away from a bottom portion of the vat while printing the 3D object.

9. The system of claim 1, further comprising an inlet in fluid communication with the vat, wherein the inlet is for supplying the photoactive resin comprising a photon absorbing species to the vat during the printing the 3D object.

10. The system of claim 9, further comprising an outlet in fluid communication with the vat, wherein the outlet is for removing the photoactive resin comprising the photon absorbing species from the vat during the printing the 3D object.

11. The system of claim 10, wherein the controller is programmed to direct adjustment of an amount of the photon absorbing species in the vat through the inlet or the outlet, to yield the first photoinhibition layer and the second photoinhibition layer.

12. The system of claim 1, wherein the first photoinitiation layer and the second photoinitiation layer have different thicknesses.

13. The system of claim 1, wherein the photoactive resin comprises a photon absorbing species, and wherein the controller is programmed to change an amount of the photon absorbing species such that the first thickness is different than the second thickness upon exposure of the photoactive resin to the first light and the second light at the first set of intensities and exposure times and the second set of intensities and exposure times.

14. The system of claim 13, wherein the photon absorbing species is a light blocking dye.

15. The system of claim 1, wherein the one or more light sources are configured and arranged to (i) illuminate the photoactive resin at a location in proximity to the window with the first light at a uniform light coverage, and (ii)

illuminate the photoactive resin with the second light at a pattern that is selected in accordance with a model of the 3D object.

\* \* \* \* \*